A. BRANDHORST.
CORN SHOCK LOADER.
APPLICATION FILED JULY 3, 1911.
1,014,043.
Patented Jan. 9, 1912.
3 SHEETS—SHEET 3.
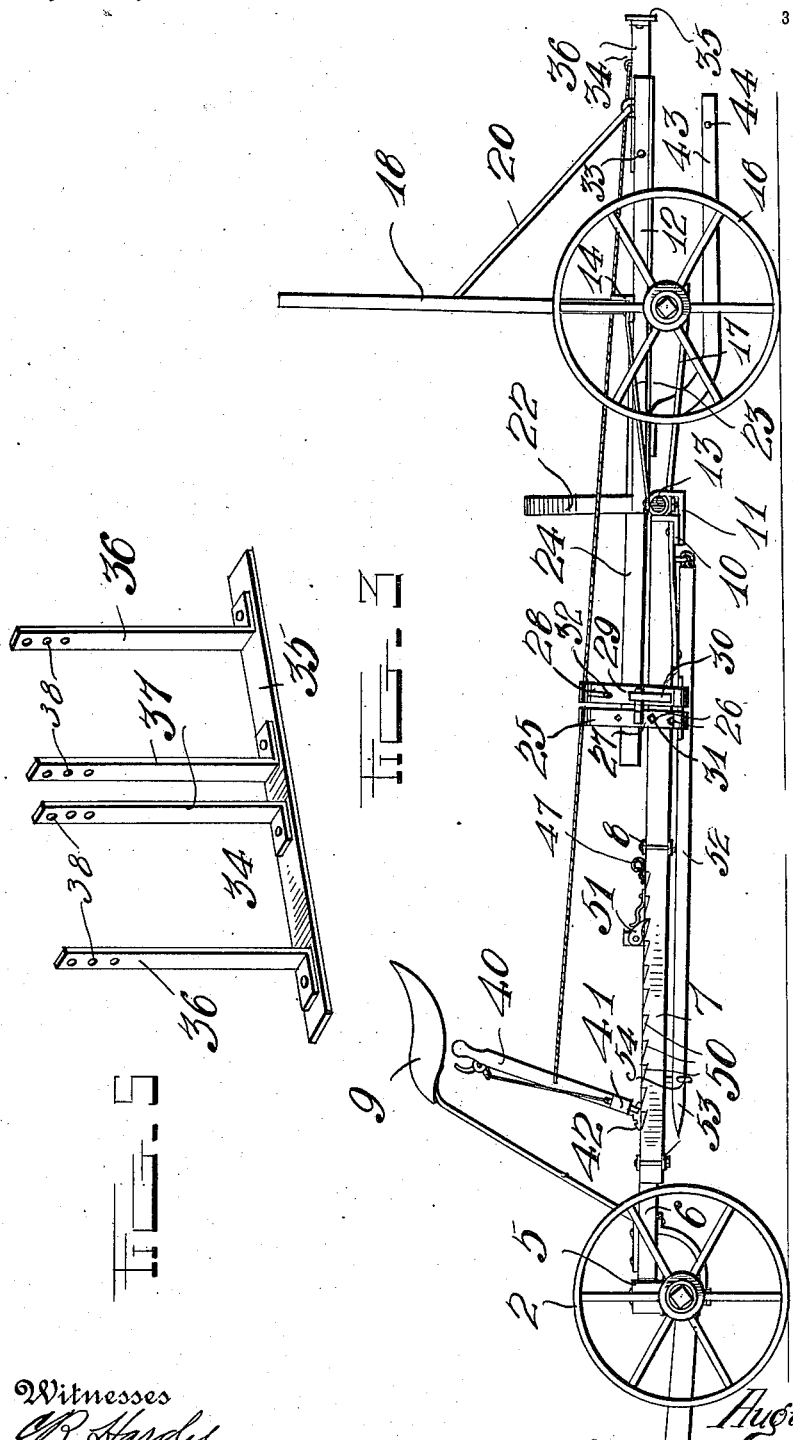
Witnesses
Inventor
August Brandhorst

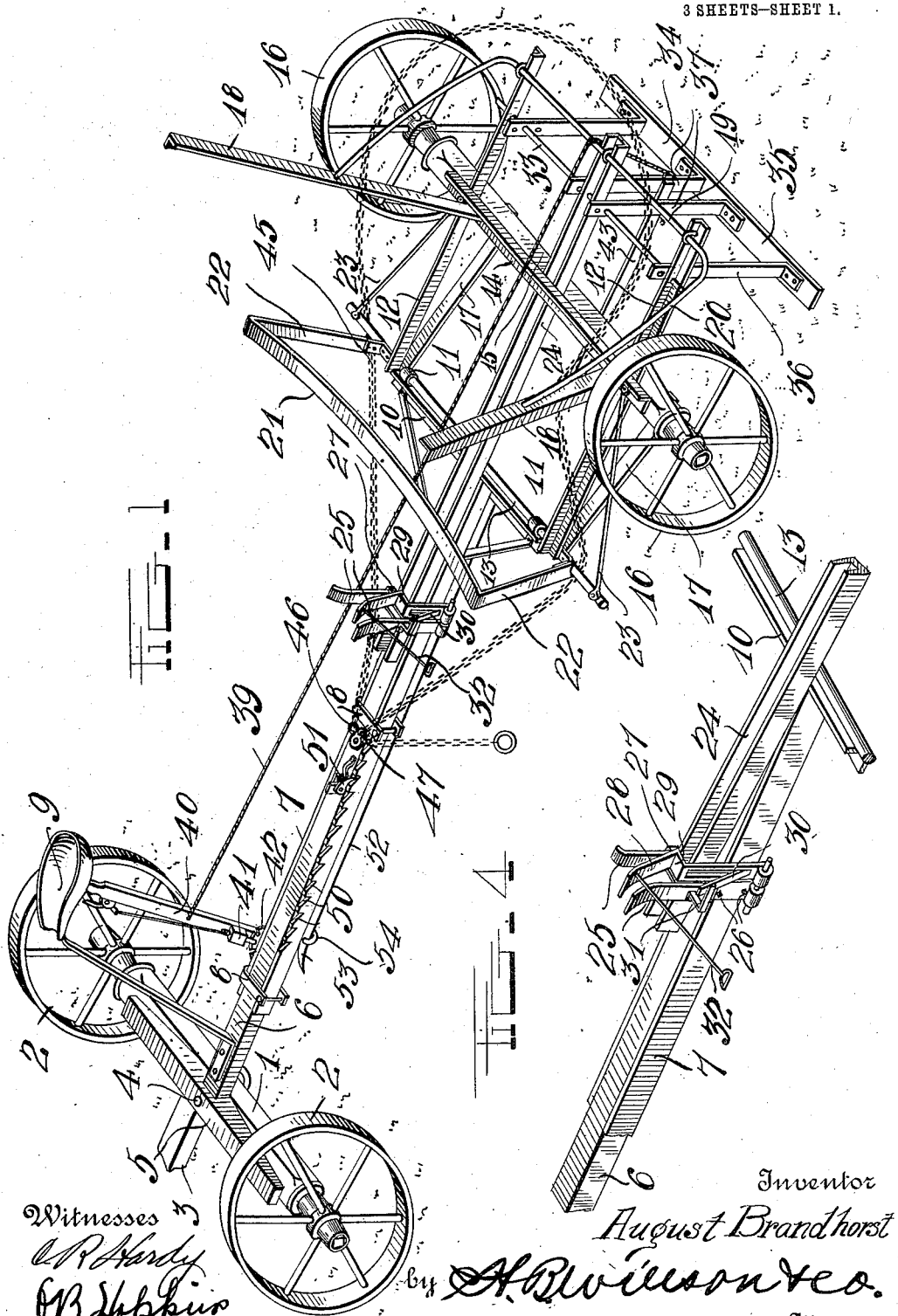

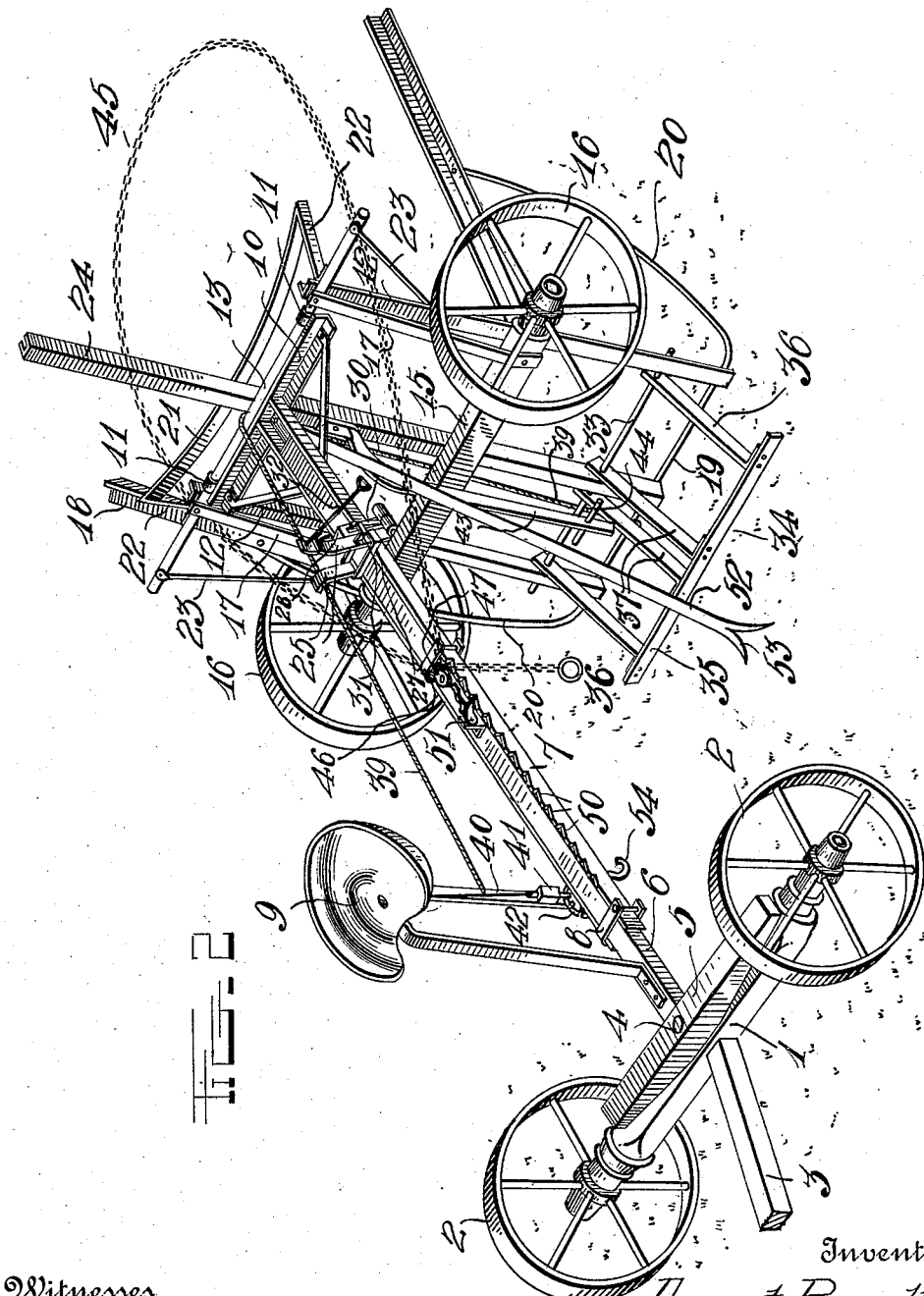

UNITED STATES PATENT OFFICE.

AUGUST BRANDHORST, OF HERMANN, MISSOURI.

CORN-SHOCK LOADER.

1,014,043.    Specification of Letters Patent.    Patented Jan. 9, 1912.

Application filed July 3, 1911. Serial No. 636,574.

*To all whom it may concern:*

Be it known that I, AUGUST BRANDHORST, a citizen of the United States, residing at Hermann, in the county of Gasconade and State of Missouri, have invented certain new and useful Improvements in Corn-Shock Loaders; and I do declare the following to be a full, clear, and exact description of the invention, such as will enable others skilled in the art to which it appertains to make and use the same.

This invention relates to improvements in corn shock loaders.

One object of the invention is to provide a loader of this character having an improved construction and arrangement of shock lifting and supporting mechanism and means whereby said mechanism is readily tilted into position to engage the shock and means to swing the shock supporting mechanism together with the shock attached thereto back into position for transporting it from the field.

With this and other objects in view the invention consists of certain novel features of construction, combination and arrangement of parts as will be more fully described and particularly pointed out in the appended claims.

In the accompanying drawings: Figure 1 is a perspective view of my improved loader showing the parts in position ready to be tilted for engagement with the shock; Fig. 2 is a similar view showing the shock lifting and supporting mechanism in a lowered position for engaging a shock; Fig. 3 is a side view of the machine with the parts in raised position as when transporting a shock; Fig. 4 is an enlarged perspective view of a portion of the reach and main frame of the machine showing more clearly the construction and arrangement of the catch for holding the shock lifting and supporting mechanism in an elevated position for transporting the shock. Fig. 5 is a detail perspective view of the fulcrum frame upon which the rack of the loader is rocked.

My improved shock loader comprises a front axle 1 and supporting wheels 2. To the axle is connected in any suitable manner a draft tongue 3. Pivotally connected to the front axle 1 by a king bolt 4 is a front bolster 5, to which is connected the forward or inner member 6 of a section reach, the rear or outer member 7 of which is adapted to receive the inner forward member, said members being preferably of channel iron construction whereby the same may be readily slipped together and adjusted longitudinally, said inner member being inverted in the outer member. The inner and outer sections of the reach are held together in sliding engagement with each other by a series of clips 8. On the forward end of the inner section 6 of the reach adjacent to the bolster 5 is arranged a transverse seat 9.

Rigidly secured to the rear end of the outer section 7 of the reach is an angle iron bar 10 to the ends of which are bolted or otherwise rigidly connected hinge members 11, said members being preferably in the form of flat metal plates having their rear ends bent into the form of bearing eyes as shown. Pivotally connected to the bar 10 of the reach by the hinge members 11 is a shock lifting and supporting mechanism comprising a substantially rectangular frame, said frame comprising angle iron side bars 12, the forward ends of which are bolted to a cylindrical tubular hinge bar 13 which is revolubly mounted in the eyes of the hinge members 11 whereby said shock lifting and supporting mechanism is hingedly connected to the reach and front part of the machine. The side bars 12 are connected together midway between their ends by an angle iron cross bar 14 and said bars are connected immediately below the cross bar 14 with a transversely disposed supporting axle 15 on the outer ends of which are mounted rear supporting wheels 16. The front end of the side bars 12 and hinge bars 13 are braced by brace bars 17 connected at their forward ends to the bar 13 and at their rear ends to the lower side of the rear axle 15 as shown in Fig. 1.

The shock lifting and supporting mechanism has arranged thereon a shock engaging rack comprising angle iron arms or bars 18 the inner lower ends of which are pivotally connected to the cross bar 14. The arms 18 project upwardly and outwardly at a suitable angle and are rigidly held in position by a bail shaped supporting rod 19 which is secured to the rear ends of the side bars 12 and has its ends 20 constructed on a curve and extended upwardly and secured to the arms 18 as shown. To the hinge bar 13 is secured a shock receiving rack comprising a transversely disposed inwardly curved bar 21 the opposite ends of which are bent inwardly to form supporting arms 22. The arms 22 are secured at their inner ends to the hinge bar 13 as shown. The outer ends of the hinge bar 13 are braced by rearwardly extending brace bars 23 which are connected to the ends of said bar 13 and to the ends of the cross bar 14 as shown.

Rigidly secured to the hinge bar 13 and cross bar 14 and at its rear end to the rod 19 is a centrally disposed channel iron holding bar 24 the forward end of which projects a considerable distance beyond the hinge bar 13 and the forward end of the bail supporting mechanism and is adapted to be swung down into engagement with a suitable fastening mechanism whereby the shock lifting and supporting mechanism are held in position for transporting the shock. The fastening mechanism for holding the bar 24 in an operative position comprises a pair of guide plates 25 which are bolted together and to the opposite sides of the outer reach section 7 by cross bolts 26, said bars having their upper ends projecting above the reach section and curved or turned outwardly to guide the bar 24 between the same. The end of the bar 24 when swung out between the plates 25 is brought into engagement with and rests upon a supporting band 27 arranged around the projecting upper ends of the plates as shown. When thus brought into engagement with the plates 25 the bar 24 is also brought into engagement with a spring catch 28 comprising a plate hingedly connected at its lower end to the lower end of one of the plates 25 whereby said catch is adapted to swing laterally when engaged by the end of the bar until the upper edge of said bar clears the offset or shoulder 29 of said catch whereupon the catch will be swung into engagement with the bar by means of a V-shaped spring 30 secured to the outer side of the plate and engaged with a stop arm or bracket 31 secured to the adjacent plate 25. The bar 24 when thus secured firmly holds the shock lifting and supporting mechanism in a substantially horizontal position for transporting the shock from the field after the shock has been bound to and lifted by said supporting mechanism. If desired I may provide the upper end of the catch 28 with a releasing rod 32 having on its outer end a suitable handle whereby the catch may be readily retracted and disengaged from the bar 24 to permit the lifting and supporting mechanism to be tilted for engagement with a shock.

Pivotally connected to a transverse supporting rod or bar 33 arranged in the rear portion of the side bars 12 is a fulcrum frame 34 upon which the shock lifting and supporting mechanism is adapted to rest when brought to a position for engaging and lifting a shock. The frame 34 comprises an outer cross bar 35 to which near its ends are secured the lower ends of right angularly disposed end bars 36 and a pair of centrally disposed bars 37, said bars 36 and 37 having in their upper ends a series of pivot holes 38 whereby the same are adjustably and pivotally connected with the supporting bar or rod 33. When not in use the frame 34 is swung upwardly to a horizontal position between the rear ends of the side bars 12 as shown in Fig. 3 of the drawings. The frame 34 is swung to and supported in a horizontal and inoperative position by means of an operating chain or cable 39 which extends forwardly and is connected at its forward end to an operating lever 40 which is pivotally connected to the forward end of the rear reach section. The lever 40 is provided with a suitable locking pawl 41 adapted to engage the teeth of a segmental rack 42 arranged on said clip as shown. The lever 40 when thus arranged is adapted to be swung upwardly and forwardly thereby swinging the fulcrum frame 34 forwardly to a horizontal or inoperative position. The frame when thus swung to an inoperative position is secured by the engagement of the pawl 41 of said lever with the teeth of the rack 42 as hereinbefore described. When the pawl is released and the lever permitted to swing back the frame 34 will drop by gravity to a position at substantially right angles beneath the frame of the shock supporting and lifting mechanism as shown in Figs. 1 and 2 of the drawing. When the frame 34 is thus swung down to an operative position beneath the shock lifting mechanism, said frame is held in position to form a fulcrum for said lifting mechanism by means of a brace bar 43, said brace comprising a longitudinally disposed bar having its forward end extending forwardly and bolted or otherwise secured to the under side of the holding bar 24 and having in its rear end below the pivot rod 33 of the fulcrum frame a transversely disposed stop rod 44 with which the centrally disposed bars 37 of the fulcrum frame are adapted to engage when the latter is swung down to an operative position. When thus engaged with the brace bar 43 the fulcrum frame 34 will be held in position to permit the shock lifting and supporting frame to be swung back and down on its rear end in a position to engage the shock, as clearly shown in Fig. 2 of the drawings.

When it is desired to engage the shock lifting and supporting mechanism with a shock the fulcrum frame 34 is first let down to an operative position in the manner described after which the catch 28 is disengaged from the inner end of the holding bar 24 thus releasing the shock lifting and supporting mechanism. After being thus released the loader is backed thus causing the cross bar 10 on the rear end of the reach to rock or tilt the lifting and supporting mechanism backwardly and downwardly on the fulcrum frame 34 until said mechanism stands on its rear end in which position the wheels 16 will be elevated above the ground as shown in Fig. 2. The shock lifting and supporting mechanism is brought to the tilted position described adjacent to the shock to be loaded and a brace bar (described below) let down, after which a binding chain 45 is passed around the shock, said chain having one end connected to a hook or loop 46 pivotally secured to one side of the inner forward section 6 on the reach while the other end of the chain is adapted to be adjustably connected with a hook 47 pivotally secured to the opposite side of the section 6 of the reach. After the chain has thus been passed around the shock and secured, the team is started forwardly thus pulling outwardly on the inner section of the reach and sliding the same forwardly through the outer section 7 which operation will draw the shock into tight engagement with the rack or frame of the supporting mechanism. The brace bar is then lifted, and further forward movement of the team will swing said supporting mechanism forwardly and upwardly on the fulcrum frame and into substantially horizontal position in which the wheels 16 are again engaged with the ground and the shock supported in position to be transported. In order to hold the inner forward section of the reach in the position to which it has been drawn when binding the shock and swinging the supporting mechanism to a horizontal position, I preferably provide one side of said outer section with a series of ratchet teeth 50 with which is adapted to be engaged a gravity pawl 51 which is pivotally connected to a bracket on the inner section, as shown.

In order to securely brace the tilting shock lifting and supporting mechanism while a shock is being secured thereto, I preferably provide a brace bar 52 which is loosely connected at one end to the lower side of the outer section 7 of the reach adjacent to the rear end thereof as shown. When thus connected the brace bar 52 is adapted to be swung down into an operative position as shown in Fig. 2 of the drawings wherein the lower end of the bar will engage the ground and thus prevent any possibility of the tilting frame from being swung upwardly until the shock has been securely bound thereto. The lower ground engaging end of the brace bar 52 is preferably provided with teeth or prongs 53 which engage the ground and prevent the end of the brace bar from slipping. When not in use the brace bar 52 is adapted to be swung upwardly and to be engaged with a suitable supporting hook 54 arranged on the lower side of the section 7 of the reach near the inner end thereof as shown.

By constructing and arranging the shock lifting and supporting mechanism as herein shown and described, it will be seen that the entire operation of engaging and binding the shock to said mechanism as well as bringing the shock to a position for transporting, and the transporting operation itself is performed by the draft animals without any effort on the part of the operator except to release the lever of the fulcrum frame and engage the binding chain with the shock. It will thus be seen that my improved shock loader is an efficient, reliable and labor saving machine by means of which shocks of corn may be quickly and easily gathered and transported from a field.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A shock loader comprising a front truck, a reach formed of inner and outer telescopic members, said inner member having its forward end secured to said front truck, a cross bar secured to the rear end of the outer member of the reach, a pawl and ratchet fastening mechanism to hold said members of the reach against inward movement, a shock lifting and supporting mechanism comprising a wheeled supporting frame hingedly connected at its forward end to the cross bar of said outer reach member and adapted to be tilted to a vertical position by the rearward movement of the loader, and a flexible shock binding element having an adjustable connection with the inner member of said reach and adapted to be engaged with a shock whereby the forward movement of the inner member of the reach will draw said shock into tight engagement with the supporting frame.

2. A shock loader comprising a front axle having thereon front supporting wheels, a bolster engaged with said axle, a reach comprising inner and outer telescopically engaged sections, said inner section having its forward end secured to said bolster, a cross bar secured to the outer end of the outer reach section, a shock lifting and supporting mechanism comprising a wheeled supporting frame hingedly connected at its forward end to the cross bar on said outer reach member, a catch arranged on said reach, a holding bar secured to said lifting and supporting frame and adapted to be swung down into engagement with said catch whereby said frame is held in an operative position to support the shock, means to release said catch to permit the frame to be tilted to a vertical position, a fulcrum frame arranged on said supporting frame and adapted to be swung into operative position to form a fulcrum on which said lifting and supporting frame is adapted to rock when tilted to a position for engaging a shock.

3. A shock loader comprising a front truck, a reach comprising inner and outer telescopically engaged members, said inner member having its forward end secured to said truck, a cross bar secured to the rear end of said outer reach section, a shock lifting and supporting frame hingedly connected at its forward end to the cross bar of said outer reach member, supporting wheels operatively arranged on said frame, means to hold said frame in an operative position to support a shock, a fulcrum frame pivotally connected to the rear end of said supporting frame and adapted to be swung down into an operative position to form a fulcrum whereby when the loader is backed, said frame will be tilted to a vertical position for engagement with the shock, a brace adapted to hold said fulcrum frame in operative position, a lever pivotally mounted on the outer member of said reach, a flexible connection between said lever and said fulcrum frame whereby the latter is swung to and held in an inoperative position, and means to bind a shock onto said supporting frame.

4. A shock loader comprising a front truck, an adjustable reach composed of inner and outer telescopic sections, said inner section having its forward end secured to said front truck, a cross bar secured to the rear end of the outer reach member, guide plates secured to the outer member of the reach, a spring catch connected with one of said guide plates, a shock lifting and supporting mechanism comprising a frame, an axle secured to said frame, supporting wheels engaged with said axle, a frame holding bar having its forward end projecting beyond the forward end of the frame and adapted to be swung down between the guide plates and into engagement with said spring catch whereby said frame is held in operative position to support a shock, a shock receiving rack arranged on said frame, and a binding chain connected to the inner member of said reach and adapted to be passed around the shock.

5. A shock loader comprising a front truck, a reach formed in inner and outer telescopically engaged members, said inner member having its forward end secured to said front truck, a cross bar secured to the rear end of the outer member of the reach, a pawl and ratchet fastening mechanism to hold said members of the reach against inward movement, a shock lifting and supporting mechanism comprising a wheeled supporting frame hingedly connected at its forward end to the cross bar of said outer reach member, means whereby said frame is tilted to a vertical position by the rearward movement of the loader, a flexible shock binding element having an adjustable connection with the inner member of said reach and adapted to be engaged with a shock whereby the forward movement of the inner member of the reach will draw said shock into tight engagement with the supporting frame and will swing the latter to an operative position for supporting the shock, a brace bar loosely connected to the outer member of the reach and adapted to be swung down into engagement with the ground to hold the shock lifting and supporting mechanism in a tilted position while the shock is being bound thereto, and means to support said bar in an inoperative position.

In testimony whereof I have hereunto set my hand in presence of two subscribing witnesses.

AUGUST BRANDHORST.

Witnesses:
EDWARD BRANDHORST,
HERMAN DOMKE.